United States Patent [19]
Ko

[11] Patent Number: 5,457,766
[45] Date of Patent: Oct. 10, 1995

[54] FAN SPEED CONTROL CIRCUIT

[75] Inventor: Chang-Kyung Ko, Suwon, Rep. of Korea

[73] Assignee: Samsung Electronics Co., Ltd., Paldal-ku, Rep. of Korea

[21] Appl. No.: 65,228

[22] Filed: May 24, 1993

[30]    Foreign Application Priority Data

May 23, 1992 [KR] Rep. of Korea ............... 8775/1992

[51] Int. Cl.$^6$ ........................................ H02P 7/29
[52] U.S. Cl. ........................ 388/831; 388/934; 318/471
[58] Field of Search ............................... 388/800, 804, 388/809, 811, 816, 819, 825, 828, 829, 830, 831, 915, 934; 318/254, 471, 472, 473

[56]             References Cited

U.S. PATENT DOCUMENTS

| | | |
|---|---|---|
| 4,489,680 | 12/1984 | Spokas et al. |
| 4,546,742 | 10/1985 | Sturges. |
| 4,555,910 | 12/1985 | Sturges. |
| 4,733,541 | 3/1988 | Ismail et al. |
| 4,763,347 | 8/1988 | Erdman. |
| 4,804,892 | 2/1989 | Muller. |
| 5,234,050 | 8/1993 | Weigert. |
| 5,363,024 | 11/1994 | Hiratsuka et al. ............ 318/254 |

*Primary Examiner*—Bentsu Ro
*Attorney, Agent, or Firm*—Robert E. Bushnell

[57]            ABSTRACT

A speed control circuit for a ventilation fan of an electronic device, such as a laser printer, adaptively varies a speed of the ventilation fan depending upon an internal temperature of the device. The speed control circuit has a temperature sensing circuit for generating a voltage depending upon the temperature, a triangular wave generator for generating a triangular wave signal having fixed period, a pulse width modulator for comparing the triangular wave signal with the voltage generated by the temperature sensing circuit and generating pulse-width modulated pulses, and a driving circuit for controlling the speed of the ventilation fan in response to the pulse-width modulated pulses so that the speed of the ventilation fan will be increased in response to an increasing temperature, for example.

12 Claims, 2 Drawing Sheets

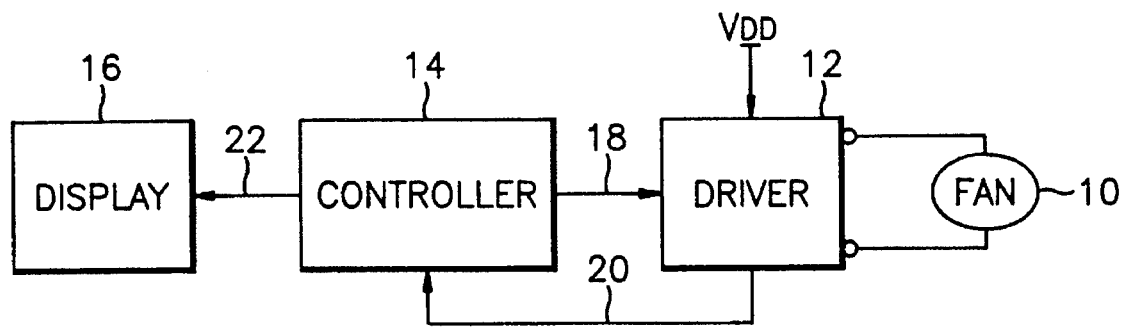
*FIG. 1*
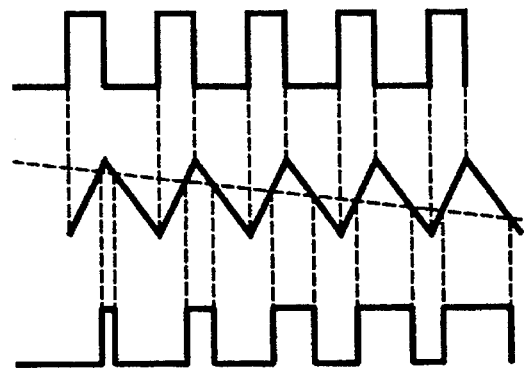
*FIG. 3A*
*FIG. 3B*
*FIG. 3C*
*FIG. 3D*
*FIG. 3E*

FAN SPEED CONTROL CIRCUIT

FIELD OF THE INVENTION

The present invention relates to a control circuit for a ventilation fan of an electronic device and, more particularly, to a speed control circuit that adaptively varies a speed of the ventilation fan in response to internal temperatures of a laser printer.

BACKGROUND OF THE INVENTION

Electronic devices for office use such as personal computers, electronic copiers, laser printers, and facsimile units etc. generate excess heat that must be actively dissipated during their operation. Generally, the active heat dissipation is performed by a ventilation fan that circulates air throughout the inside of a housing of the electronic device. The circulating air carriers off the excess heat generated by circuits and mechanical elements of the electronic device thereby preventing internal heat build up that could lead to misoperation and damage.

A number of drawbacks are associated with the ventilation fans. First, they consume power which increases the overall power consumption of the electronic device. This fact is of special interest since attention has been recently directed toward reducing the overall power consumption of personal computers and other office electronic devices to produce so called "green machines." Advances in the area of lowering power consumption include power saving chips that have sleep modes and screen saving devices.

Secondly, the ventilation fans have the added drawback of generating excessive noise. This noise is especially troublesome since computers and printers are in close proximity to office workers. Thus, the noise provides a continuous distraction.

SUMMARY OF THE INVENTION

Accordingly, it an object of the present invention to provide an improved ventilation control process and ventilation fan control circuit.

It is another object of this invention to provide a ventilation fan control circuit that minimizes power consumption of a ventilation fan.

It is a further object of the present invention to provide a ventilation fan control circuit that minimizes noise generated by a ventilation fan.

It is still a further object of the present invention to provide a ventilation fan control circuit that adaptively varies a speed of a ventilation fan in dependance upon an internal temperature of an electronic device.

These and other objects may be achieved according to one aspect of the present invention, with a process and a fan speed control circuit for an electronic device having a ventilation fan for dissipating excess heat comprises: a temperature sensing circuit for detecting a temperature within the electronic device and for generating a temperature dependent voltage in response to the detected temperature, a triangular wave generator for generating a triangular wave signal, a pulse-width modulator for generating pulse-width modulated pulses in response to comparisons of the triangular wave signal and the temperature dependent voltage, and driving means for driving the ventilation fan in response to the pulse-width modulated pulses.

BRIEF DESCRIPTION OF THE DRAWINGS

The above objects and other advantages of the present invention will become more apparent by way of a description of a preferred embodiment of the present invention with reference to the attached drawings, in which:

FIG. 1 shows a schematic block diagram illustrating a ventilation fan driving system;

FIGS. 3A through 3E illustrate waveform diagrams of time varying voltages generated in the circuit of FIG. 2.

DETAILED DESCRIPTION OF THE INVENTION

Figure 2:
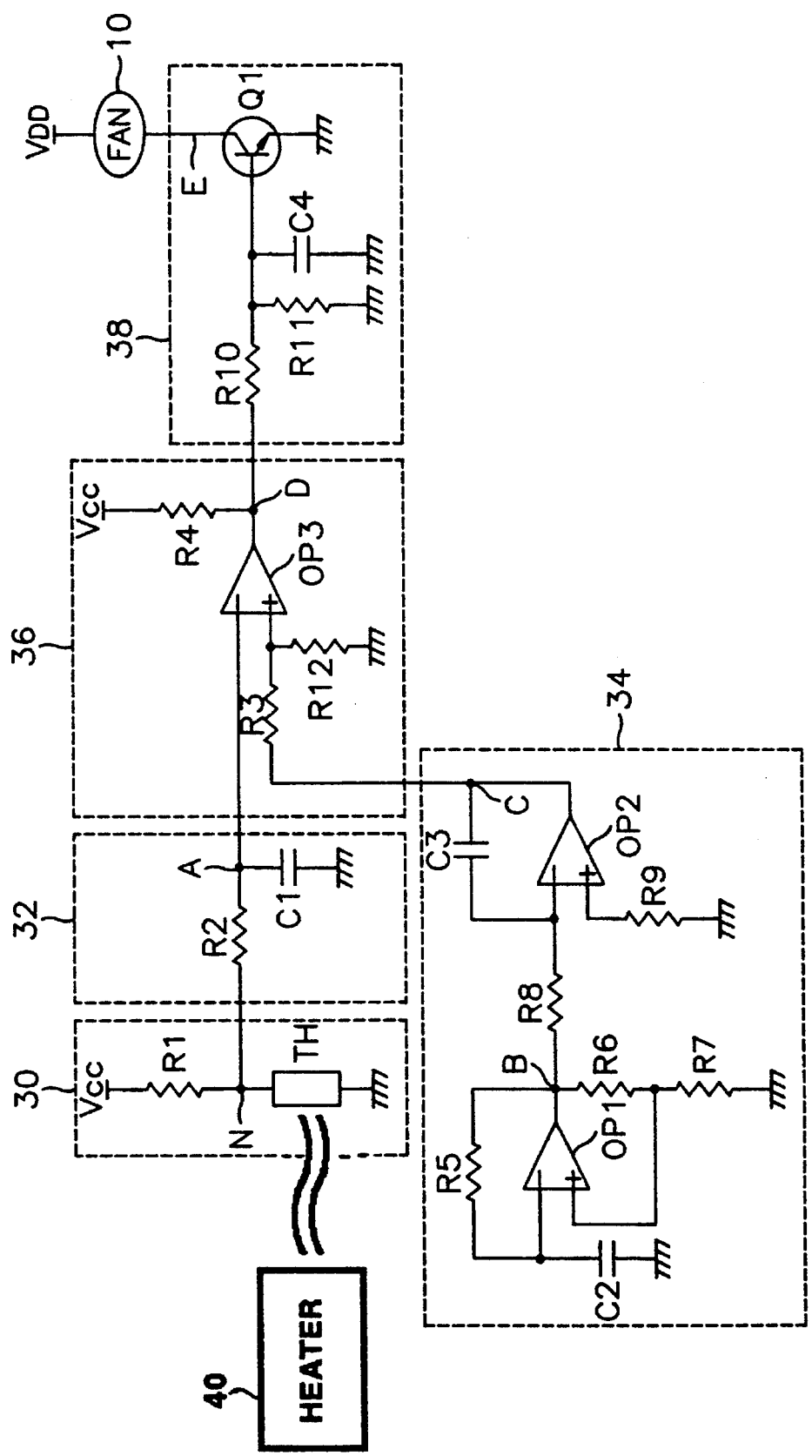
FIG. 2 illustrates a preferred embodiment of a speed control circuit for a ventilation fan according to the present invention.

Turning now to the drawings, FIG. 1 illustrates a ventilation fan driving system for an electronic device. Specifically, a ventilation fan 10 is driven via a supply voltage $V_{DD}$ supplied by a fan driver 12. The fan driver 12 is controlled by a controller 14, a microprocessor. The controller 14 receives a feed back of operating states of the ventilation fan 10 from the fan driver 12. The controller 14 also controls a display 16 to provide visual indica indicative of these operating states.

The system of FIG. 1 operates as follows. When the controller 14 is powered up when the electronic device is turned on, the controller 14 provides a drive request signal on line 18 to the fan driver 12. In response to this drive request signal, the fan driver 12 supplies the supply voltage $V_{DD}$ to the ventilation fan 10. As a result, the ventilation fan 10 is driven simultaneously with the initialization of the controller 12. The ventilation fan 10 is positioned in the electronic device so as to circulate air throughout the inside of the housing of the electronic device. Monitoring signals representing a current operating state of the ventilation fan 10 are generated by the driver 12 and provided to the controller 14 via line 20. The controller 14 controls the display to provide information concerning the ventilation fan's operation in response to the monitoring signals.

In the fan driving system shown in FIG. 1, the ventilation fan 10 is supplied with a same operation voltage throughout the entire operation of the electronic device. As a result, the speed of the ventilation fan 10 is constant at all times. The generation of excess heat by the electronic device, however, is not constant.

In an electronic device such as a personal computer, the excess heat dissipation requirements change depending on the environment. For example, if the ambient air temperature surrounding the electronic device is relatively low, then excess heat generated by the disk drives or electronic components of the personal computer can be dissipated more easily. In some cases, especially on a cold day, it might be possible to dissipate any excess heat passively without a ventilation fan. In contrast, however, on a day in which the ambient air temperature surrounding the personal computer is high or if sunlight is shining directly upon the personal computer, the excess heat that must be dissipated is increased dramatically requiring the ventilation fan to operate at a high speed.

The heat dissipation requirements of the ventilation fan are also affected by the electronic device's operation. For example, a printing apparatus such as a laser printer includes a heater for constantly maintaining a fuser element at near operating temperatures during standby states and at operating temperatures during printing. The fuser element fuses powdered toner to the paper by application of heat. Specifically, during the stand-by state, the heater maintains the fuser element at a temperature of approximately 150° C., whereas during printing operations, the fuser element is maintained at 180° C.

Excess heat generated by the heater must be dissipated to the ambient environment otherwise it will cause damage to the other electronic components of the laser printer. Because of the temperature differences of the fuser unit during standby states and printing operations, the heat dissipation requirements of the laser printer vary accordingly. That is, during a warm up mode when the heater is heating the fuser unit to standby temperature, the operation of the ventilation fan increases the time necessary for bringing the fuser unit's temperature up to 150° C. Therefore, prior to the time when the fuser unit reaches its stand-by temperature, the ventilation fan is actually undermining the operation of the printing device. Once the fuser unit reaches 150° C., the ventilation fan may or may not need to run to carry off any the excess heat generated by the heater in dependence upon environmental conditions and the laser printer's construction. During the printing operation, however, since the operating temperature of the fuser unit is at 180° C., the excess heat dissipation requirements are greater than during stand-by. Since the ventilation fan is run at a constant speed, this speed must be chosen for the worst case scenarios such as during a printing operation on a day when the office air conditioning is broken. Therefore, the cooling capacity of the ventilation fan will be excessive during most of the electronic devices operation especially during the stand-by state. Moreover, the excess cooling capacity will be deleterious during the warm-up mode since the heater must overcome the cooling effect of the ventilation fan on the fuser unit. Consequently, conventional fan driving systems have been inadequate.

FIG. 2 shows a preferred embodiment of a fan speed control circuit for an electronic device such as laser printer constructed according to the principals of the present invention. A temperature sensing circuit 30 detects a temperature within the electronic device. The temperature sensing circuit comprises a resistor R1 and a thermistor TH cascade connected between a supply voltage $V_{CC}$ and a ground potential. A detected temperature dependent voltage is generated at node N between the resistor R1 and the thermistor TH. The thermistor TH is positioned in close proximity to the heater 40 of the laser printer to ensure that the thermistor is reactive to heat generated by the heater 40.

A low-pass filter 32 lowpass filters the detected temperature dependent voltage to provide a low-pass filtered temperature dependent voltage at a node A. The low-pass filter 32 includes a resistor R2 connected between node N and node A and a capacitor C1 connected between node A and a ground potential.

A triangular wave generator 34 provides a triangular wave signal having a constant period. The triangular wave generator 34 has an operational amplifier, op-amp, relaxation oscillator portion that is formed with a first op-amp OP1 having an output identified as a node B, a resistor R5 in a feedback configuration between node B and the inverting input terminal (−) of the first op-amp OP1, a capacitor C2 connected between the inverting input terminal of the first op-amp OP1 and a ground potential, and resistors R6 and R7 cascade connected between the node B and the ground potential. The non-inverting input terminal (+) of the first op-amp OP1 is connected to a common terminal of resistors R6 and R7.

The triangular wave generator 34 also has a shaping portion that includes a second op-amp OP2 having an output identified as a node C, a resistor R8 connected between node B and an inverting input terminal of the second op-amp OP2, a capacitor C3 connected between node C and the inverting input terminal of the second op-amp OP2, and a resistor R9 connected between a non-inverting input terminal of the second op-amp OP2 and a ground potential. This shaping portion converts a square wave generated by the relaxation oscillator portion into the triangular wave signal.

A pulse-width modulator 36 generates pulse-width modulated pulses in response to the triangular wave signal and the low-pass filtered temperature dependant voltage. The pulse-width modulator 36 includes a third op-amp OP3 having an output terminal identified a node D, resistors R3 and R12 cascade connected between node C and a ground potential, a common terminal of resistors R3 and R12 being connected to a non-inverting input terminal of the third op-amp OP3, and a resistor R4 connected between node D and the supply voltage $V_{CC}$. An inverting input terminal of the third op-amp OP3 is connected to node A to receive the low-pass filtered temperature dependent voltage.

A driving circuit 38 controls a speed of a ventilation fan 10 in response to the pulse-width modulated pulses generated by the pulse-width modulator. Specifically, the driving circuit 38 includes a resistor R10 connected between the node D and a base of a bipolar junction transistor, BJT, Q1. A resistor R11 and capacitor C4 are connected in parallel between the base of the BJT Q1 and a ground potential. The ventilation fan 10 is connected between a power voltage $V_{DD}$ and a collector of the BJT Q1. The emitter of the BJT Q1 is connected to a ground potential.

Hereafter, a description of the operation of the fan speed control circuit of FIG. 2 will be presented with reference to the waveform diagrams FIG. 3A through 3E that illustrate time dependent voltages generated in the fan speed control circuit of FIG. 2. Specifically, FIG. 3A shows the low-pass filtered temperature dependent voltage, FIG. 3B shows the square wave generated by the relaxation oscillator portion of triangular wave generator 34, FIG. 3C shows the triangular wave signal generated by the triangular wave generator 34, FIG. 3D shows the pulse-width modulated pulses generated by the pulse-width modulator 36 in response to the falling low-pass filtered temperature dependent voltage of FIG. 3A, and FIG. 3E show pulse width modulated pulses generated by the pulse width modulator 36 in response to a rising low pass filtered temperature dependent voltage (not shown).

The thermistor TH is placed in the electronic device to detect the internal temperature of the electronic device and preferably near the heater 40 of the fuser unit when the electronic device is a laser printer. The resistance of the thermistor TH decreases with an increasing temperature. Consequently, the detected temperature dependent voltage of node N is determined according to the formula:

$$V_{node\ N} = (R_{TH}(t)/(R_{TH}(t)+R_{R1}))*V_{CC} \qquad (1)$$

wherein $R_{TH}(t)$ is a resistance of the thermistor TH according to its temperature.

Accordingly, the detected temperature dependent voltage is provided at node N. If the internal temperature were to gradually increasing by printing, for example, the detected temperature dependent voltage $V_{node\ N}$ of node N decreases as shown in FIG. 3A. In contrast, a decreasing internal temperature would yield an increasing detected temperature dependent voltage. The detected temperature dependent voltage is low-pass filtered by the low-pass filter 32 and provided to the third op-amp OP3 as the low-pass filtered temperature dependent voltage.

The relaxation oscillator portion of the triangular wave generator 34 generates a square wave as shown in FIG. 3B. The frequency of this square wave is a function of a time constant determined by the resistor R5 and the capacitor C2. The op-amp OP2 integrates this square wave by a constant value determined by the resistor R8 and the capacitor C3 to generate the triangular wave signal shown by FIG. 3C.

The op-amp OP3 receives and compares the triangular wave signal of FIG. 3C and the low-pass filtered temperature dependent voltage of FIG. 3A. The op-amp OP3 generates a logic "high" signal when the level of triangular wave signal is greater than the low pass filtered temperature dependent voltage as shown by FIG. 3D. That is, the operational amplifier OP3 compares the triangular wave signal with the low pass filtered temperature dependent voltage and generates pulse-width modulated pulses which are received at the base of the BJT Q1 through the pull-up resistor R4 and the bias resistors R10 and R11.

The BJT Q1 is controlled by the pulse width modulated pulses so that the BJT Q1 is "on" when the pulse width modulated pulses are "high" and the BJT Q1 is "off" when the pulse width modulated pulses are "low". As a result, the pulse-width modulated pulses as shown in FIG. 3D are provided at the base of the BJT Q1 in response to a decreasing low-pass filtered temperature dependant voltage resulting from an increasing internal temperature. Therefore, the effective voltage supplied to the ventilation fan 10 is increased so that the ventilation fan 10 speed increases. Contrarily, if the high pulse widths of the pulse width modulated pulses were to narrow as shown in FIG. 3E, an effective voltage supplied to the ventilation fan 10 is decreased, thereby causing the ventilation fan's speed to decrease.

Accordingly, if the internal ambient temperature is high, the circuit of FIG. 2 provides a large effective voltage to the ventilation fan 10. When the internal temperature is low, the effective voltage supplied to the fan is low resulting in a low ventilation fan speed.

In a laser printer having different standby and printing operation fuser unit temperatures, the ventilation fan speed can be adaptively controlled according to the internal temperature of the laser printer thereby lowering power consumption and reducing noise production. Further, the fan speed automatically adjusts to environmental conditions. In description of an embodiment of the present invention, a laser printer is described by example, but the present invention can be used in all electronic devices in which excess heat must be actively dissipated.

What is claimed is:

1. A fan speed control circuit for an electronic device having a ventilation fan for dissipating excess heat, said circuit comprising:

a temperature sensing circuit for detecting a temperature within said electronic device, and for generating a temperature dependent voltage in response to the detected temperature;

a low pass filter for providing a low pass filtered voltage by low pass filtering said temperature dependent voltage;

triangular wave generating means for generating a triangular wave signal;

pulse-width modulating means for generating pulse-width modulated pulses by comparing said triangular wave signal to said low pass filtered voltage; and driving means for driving said ventilation fan in response to said pulse-width modulated pulses, said driving means being comprised of:

voltage dividing resistors for generating a divided pulse signal by performing voltage division on said pulse-width modulated pulses generated by said pulse width modulating means;

a capacitor connected between a node formed between, the dividing resistors, and a reference voltage; and a transistor connected between said ventilation fan and said reference voltage, said transistor being turned on in response to said divided pulse signal.

2. A fan speed control circuit for an electronic device as claimed in claim 1, wherein said temperature sensing circuit comprises a resistor and a thermistor serially connected between a supply voltage and said reference voltage, said thermistor being positioned in said electronic device to be sensitive to an internal temperature of said electronic device.

3. A fan speed control circuit for an electronic device having a ventilation fan for dissipating excess heat, said circuit comprising:

a temperature sensing circuit for detecting a temperature within said electronic device, and for generating a temperature dependent voltage in response to the detected temperature, said temperature sensing circuit being disposed in close proximity to a heater for heating a fuser unit in said electronic device in order to exhibit a thermal response to said heating of the fuser unit;

a low pass filter for providing a low pass filtered voltage by low pass filtering said temperature dependent voltage;

triangular wave generating means for generating a triangular wave signal;

pulse-width modulating means for generating pulse-width modulated pulses by comparing said triangular wave signal to said low pass filtered voltage; and driving means for driving said ventilation fan in response to said pulse-width modulated pulses.

4. A speed control circuit for a ventilation fan of a printer, said circuit comprising:

temperature sensing means for generating a detected temperature dependent voltage in response to an internal ambient temperature of said printer, said temperature sensing means comprising a resistor and a thermistor connected in series between a supply voltage and a reference voltage, said thermistor being positioned near a heater, said heater being utilized for heating a fixing device of said printer, said detected temperature dependent voltage being generated at a junction between said resistor and said thermistor;

low-pass filter means for generating a low-pass filtered temperature dependent voltage by low pass filtering said detected temperature dependent voltage;

triangular wave generator means for generating a triangular wave signal from an oscillator signal;

pulse-width modulator means for making a comparison of said triangular wave signal from said triangular wave generator means with said low-pass filtered temperature dependent voltage from said low-pass filter means, and for generating pulse-width modulated pulses corresponding to said comparison; and driving means for controlling a voltage supplied to said ventilation fan in response to said pulse-width modulated pulses.

5. A circuit as claimed in claim 4, wherein said driving means being comprised of:

voltage dividing resistors for generating a divided voltage signal by performing voltage division on said pulse-width modulated pulses generated by said pulse-width modulator means, and a transistor connected between said ventilation fan and said reference voltage, said transistor being exhibiting an electrically conducting state in response to said divided voltage signal.

6. An apparatus for controlling a ventilation fan in an electronic device, said apparatus comprising:

a first resistor connected at a first node to a thermistor, said resistor being further connected to a voltage source and said thermistor being further connected to a reference voltage, wherein a temperature dependent voltage is generated at said first node in response to a change in a resistance value of said thermistor in response to ambient heat in said device;

a low pass filter connected between said first node and a second node, said low pass filter filtering said temperature dependent voltage and providing a filtered temperature dependent voltage to said second node;

a relaxation oscillator generating a square wave signal;

an integrator converting said square wave signal into a triangular wave signal;

a pulse width modulator having a first input terminal connected into said second node for receiving said filtered temperature dependent voltage and having a second input terminal connected to an output of said integrator for receiving said triangular wave signal, said pulse width modulator generating a pulse width modulation signal by comparing said filtered temperature dependent voltage and said triangular wave signal; and a driver for controlling a speed of the ventilation fan in dependent upon said pulse width modulation signal.

7. The apparatus as set forth in claim 6, wherein said pulse width modulator comprises:

a second resistor;

an operational amplifier having an inverting input terminal connected to said first input terminal and a non-inverting input terminal connected to said second input terminal through said second resistor;

a third resistor connected between said noninverting input terminal and said reference voltage; and a fourth resistor connected between an output terminal of said operational amplifier and said voltage source.

8. The apparatus as set forth in claim 7, wherein said driver comprises:

a fifth resistor;

a transistor having a collector connected to said ventilation fan, an emitter connected to said reference voltage and a base connected to said output terminal of said pulse width modulator through said fifth resistor; and a sixth resistor and a capacitor connected in parallel between said base and said reference voltage.

9. The apparatus as set forth in claim 6, wherein said relaxation oscillator comprises:

a second resistor; a first operational amplifier having an inverting input terminal connected to said reference voltage through a capacitor and a non-inverting input terminal connected to said reference voltage through said second resistor;

a feedback resistor connected between an output terminal of said operational amplifier and said inverting input terminal; and a third resistor connected between said output terminal and said non-inverting input terminal.

10. The apparatus as set forth in claim 9, wherein said integrator comprises: a fourth resistor;

a fifth resistor; a second operational amplifier having an inverting input terminal connected to the output terminal of said first operational amplifier through said fourth resistor and a non-inverting input terminal connected said reference voltage through a fifth resistor; and a feedback capacitor connected between an output terminal of said second operational amplifier and said inverting input terminal of said second operational amplifier, said integrator generating said triangular wave signal by integrating said square wave signal as a function of a value determined by said fourth resistor and said feedback capacitor.

11. The apparatus as set forth in claim 6, wherein said driver comprises:

a second resistor;

a transistor having a collector connected to said ventilation fan, an emitter connected to said reference voltage and a base connected to an output terminal of said pulse width modulator through said second resistor; and a third resistor and a capacitor connected in parallel between said base and said reference voltage.

12. A method for controlling a ventilation fan in an electronic device, said method comprising the steps of:

generating a temperature dependent voltage in response to a change in a resistance value of a thermistor in response to ambient heat in said device;

providing a filtered temperature dependent voltage by filtering said temperature dependent voltage;

generating a square wave signal;

converting said square wave signal to a triangular wave signal;

generating a pulse width modulation signal by comparing said filtered temperature dependent voltage and said triangular wave signal; and controlling a speed of said ventilation fan in dependence upon said pulse width modulation signal.

* * * * *